(12) United States Patent
Milano

(10) Patent No.: US 7,800,453 B2
(45) Date of Patent: Sep. 21, 2010

(54) APPARATUS AND METHODS FOR RADAR IMAGING BASED ON INJECTED PUSH-PUSH OSCILLATORS

(75) Inventor: Alberto Milano, Rehovot (IL)

(73) Assignee: Beam Networks Ltd., Rehovot (IL)

( * ) Notice: Subject to any disclaimer, the term of this patent is extended or adjusted under 35 U.S.C. 154(b) by 0 days.

(21) Appl. No.: 12/092,579

(22) PCT Filed: Sep. 6, 2006

(86) PCT No.: PCT/IL2006/001039

§ 371 (c)(1),
(2), (4) Date: May 5, 2008

(87) PCT Pub. No.: WO2007/052247

PCT Pub. Date: May 10, 2007

(65) Prior Publication Data

US 2008/0278369 A1    Nov. 13, 2008

(30) Foreign Application Priority Data

Nov. 7, 2005   (IL) .................................. 171817

(51) Int. Cl.
*H03L 7/00* (2006.01)
(52) U.S. Cl. .......................... 331/34; 342/175
(58) Field of Classification Search ............ 342/175
See application file for complete search history.

(56) References Cited

U.S. PATENT DOCUMENTS 6,069,580 A    5/2000 Martinson
6,326,854 B1    12/2001 Nicholls et al.
2001/0004225 A1*    6/2001 Nicholls et al. ............ 331/34
2005/0046500 A1*    3/2005 Rohde et al. ............ 331/117 R
2005/0184816 A1*    8/2005 Aikawa et al. ......... 331/107 SL

OTHER PUBLICATIONS

Yoon, S. W., et al. "A Compact GAAS MESFET-Based Push-Push With Low Phase-Noise Performance Oscillator MMIC Using Differential Topology",2001 IEEE GaAs Digest pp. 45-48.

Sinnesbichler, F. X. "Hybrid Millimeter-Wave Push-Push Oscillators Using Silicon-Germanium HBTs"; IEEE Transactions on Microwave Theory and Techniques, vol. 51, No. 2, Feb. 2003; pp. 422-430.

Xiao, H. et al, "A Low Phase Noise Ku-Band Push-Push Oscillator Using Slot Ring Resonator", 2004 IEEE MTT-S Digest; pp. 1333-1336.

Ramirez, F. et al, "Nonlinear simulation techniques for the optimized design of pushpush oscillators",2003 IEEE MTT-S Digest; pp. 2157-2160.

Dussopt, L. et al. "A Low Phase Noise Silicon 9 GHz VCO and an 18 GHz Push-Push Oscillator", 2002 IEEE MTT-S Digest; pp. 695-698.

(Continued)

*Primary Examiner*—Thomas H Tarcza
*Assistant Examiner*—Timothy A Brainard
(74) *Attorney, Agent, or Firm*—Soroker-Agmon Advocates & Patent Attorneys

(57) ABSTRACT

The present invention relates to radar imaging and to phased array antennas. The invention also relates to transmitter/receiver modules, push-push oscillators and Injection locked push-push oscillators for phased array antennas. The invention reduces the production cost and improves the performance of conventional phased array antennas.

23 Claims, 17 Drawing Sheets

OTHER PUBLICATIONS

Sinnesbichler et al. "A 38-GHz Push-Push Oscillator Based on 25-GHz fT BJT's", IEEE Microwave and Guided Wave Letters, vol. 9, No. 4. Apr. 1999; pp. 151-153.

Kurorawa, K., "Injection Locking of Microwave Solid-State Oscillators"; Proceedings of the IEEE, vol. 61, No. 10, Oct. 1973; pp. 1386-1413.

Jeiewski, M. T., "An Approach to the Analysis of Injection-Locked Oscillators"; IEEE Transactions on Circuits And Systems, vol. CAS-21, No. 3, May 1974; pp. 395-401.

Plessas, F. and Kalivas, G., "Locking Techniques for RF Oscillators at 5—6 GHz Frequency Range"; ICECS-2003; pp. 986-989.

Pavio A.M and M.A. Smith, "A 20-40-GHz Push-Push Dielectric Resonator oscillator"; IEEE Transactionson Microwavetheoryand Techniques, vol. MTT-33, No. 12 Dec. 1985; pp. 1346-1349.

Winch, R. G., "Wide-Band Varactor-Tuned Oscillators"; IEEE Journal of Solid-State Circuits, vol. SC-17, No. 6, Dec. 1982: pp. 1214-1219.

Pavio, A. M and M. A. Smith, "Push-Pushdielectricresonator Oscillator", 1985 IEEE MTT-S Digest, p. 266-269.

* cited by examiner

NOVEL T/R MODULE FOR HIGH DEFINITION IMAGING RADAR

PRIOR ART FIG. 3

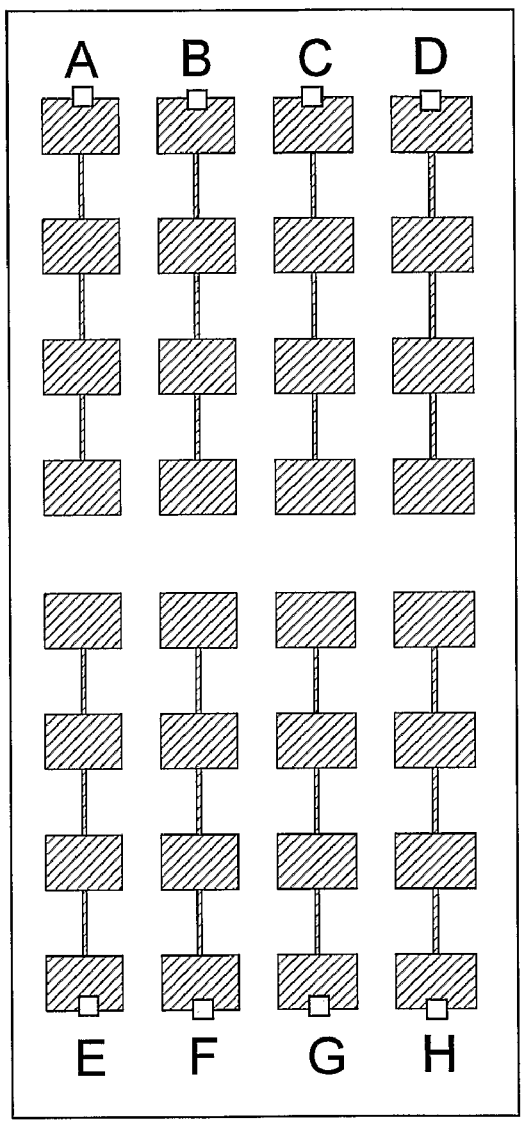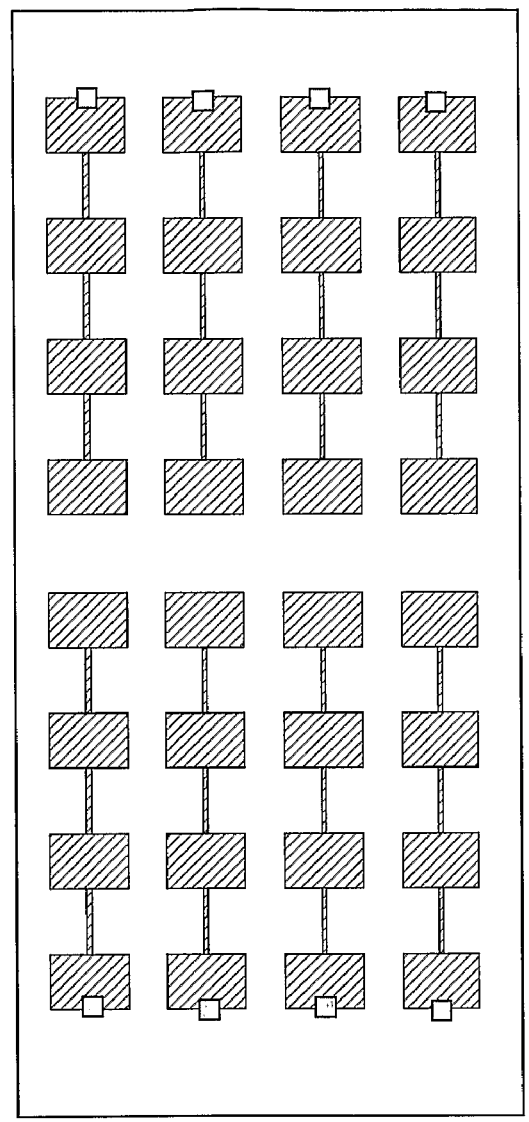
FIG. 13

APPARATUS AND METHODS FOR RADAR IMAGING BASED ON INJECTED PUSH-PUSH OSCILLATORS

FIELD OF THE INVENTION

The present invention relates to T/R (transmitter/receiver) modules for phased array antennas and to imaging radars generally.

BACKGROUND OF THE INVENTION

Push-push oscillators are known. Injection locked oscillators are known. The state of the art for push-push oscillators and injection locked single ended oscillators is believed to be represented by the following publications:

Yoon, S. W., et al. "A compact GaAs MESFET-based push-push oscillator MMIC using . . . ", 2001 IEEE GaAs Digest, p. 45 onward;

Sinnesbichler, F. X. "Hybrid millimeter-wave push-push oscillators . . . ", IEEE Transactions on Microwave Theory and Techniques, Vol. 51(2), February 2003, p. 422 onward;

Xiao, H. et al, "A low phase noise Ku-band push push oscillator . . . ", 2004 IEEE MTT-S Digest, p. 1333 onward;

Ramirez, F. et al, "Nonlinear simulation techniques for the optimized design of push-push oscillators . . . ", 2003 IEEE MTT-S Digest, p. 2157 onward;

Dussopt, L. et al, "A low phase noise silicon 9 GHz VCO and an 18 GHz push-push oscillator", 2002 IEEE MTT-S Digest, p. 695 onward;

Sinnesbichler et al, "A 38-GHz push-push oscillator . . . ", IEEE Microwave and Guided Wave Letters, Vol. 9(4), April 1999, p. 151 onward;

Kurokawa, K., "Injection locking of microwave solid-state oscillators", Proceedings of the IEEE, 61(10), October 1973, p. 1386 onward;

Jezewski, M. T., "An approach to the analysis of injection-locked oscillators", IEEE Transactions on Circuits and Systems, CAS-21(3), May 1974, p. 395 onward;

Plessas, F. and Kalivas, G., "Locking techniques for RF oscillators . . . ", ICECS-2003, p. 986 onward;

Pavio. A. M. and M. A. Smith. "Push-push dielectric resonator oscillator", 1985 IEEE MTT-S Digest, p. 266 onward;

Pavio, A. M and M. A. Smith, "A 20-40-GHz push-push dielectric resonator oscillator", IEEE Transactions on Microwave Theory and Techniques, MTT-33(12), December 1985, pp. 1346 onward; and Winch, R. G., "Wide-band varactor-tuned oscillators", IEEE Journal of Solid-State Circuits, Vol. SC-17(6), December 1982.

The disclosures of all publications mentioned in the specifications, and of the publications cited therein directly or indirectly, are hereby incorporated by reference.

SUMMARY OF THE INVENTION

A preferred embodiment of the present invention seeks to provide an improved phased array antenna comprising T/R modules based on injection locked push-push oscillators.

A preferred embodiment of the present invention also seeks to simplify the receiving path of the T/R module, by demodulating the received signal immediately after the antenna, using a direct conversion mixer. Each receiving path preferably includes a receiving antenna and a receiver protector, a one-stage low noise amplifier (LNA) and a direct down converter. In contrast, in conventional high definition systems such as airborne radar systems, the receiving path typically includes, in addition to the elements described above, 3 switches, a multi-stage medium power amplifier and a phase shifter.

It is an object of a preferred embodiment of the present invention to reduce the production cost, size and weight of the main frame of the radar.

It is an object of a preferred embodiment of the present invention to reduce the complexity and the production cost of the T/R module.

It is also an object of a preferred embodiment of the present invention to eliminate, in the transmitting path of the T/R module, the loss caused by the phase shifter.

It is further an object of a preferred embodiment of the present invention to improve the linearity of the phase shift of the signal versus the operating frequency.

It is also an object of a preferred embodiment of the present invention to improve the third harmonic intercept point (IP3) of the RX (receiver), by limiting the size of the amplification chain of the LNA (low noise amplifier).

A preferred embodiment of the present invention achieves all the above advantages by providing a chain of push-push oscillator circuits embedded in a T/R module constructed and operative in accordance with a preferred embodiment of the present invention, having one, some or all of the following characteristics and performing direct down conversion:

The conventional phase shifter is entirely eliminated.

The reference signal generated by the radar main frame has lower frequency than the radiated signal, such that the manifold is less affected by power loss.

The total phase shift of the signal is preferably partitioned between the individual push-push oscillator circuits, e.g. three levels of PS-IPPO may each effect a 120 degree phase shift giving a total 360 degree phase shift. Phase scan results are improved by the frequency multiplication which characterizes push-push oscillators.

The structure of the main frame of the radar preferably makes use of components that are simpler, cheaper and smaller than corresponding conventional components.

The power of the signal delivered to each of the new T/R modules may be even lower than the level required by a traditional T/R module, such that the overall efficiency of the system is improved.

The mechanical structure of a high-definition phased array antenna, based on the T/R module shown and described herein and suitable for airborne radar applications, may be the same as the of conventional antennae of this genre, in which case the TX and RX modules may be integrated into the same mechanical housing.

There is thus provided, in accordance with a preferred embodiment of the present invention, a reference signal generator comprising a quartz oscillator; and at least one level of push-push oscillators cascaded with the quartz oscillator.

Also provided, in accordance with a preferred embodiment of the present invention, is a transmitter/receiver module comprising at least one level of push-push oscillators; and a receiving functionality receiving a sampled portion of power subsequently radiated by the push-push oscillators. Power which is to be radiated by the push-push oscillators is preferably sampled and the resulting sample is received by the receiving functionality.

Further provided, in accordance with a preferred embodiment of the present invention, is radar imaging apparatus comprising a reference signal generator as above and a phased array antenna including at least one transmitter/receiver module and radiating apparatus cascaded with the reference generator and with at least one transmitter/receiver module.

Further in accordance with a preferred embodiment of the present invention, the transmitter/receiver module comprises a plurality of levels of push-push oscillators.

Also provided, in accordance with a preferred embodiment of the present invention, is injection locked push-push oscillator apparatus comprising a 0 degree power divider. The 0 degree power divider has the purpose of dividing a received reference signal having high stability and low noise characteristics into a first portion and a second portion, which is delayed by an odd multiple of 180 degrees relative to the first portion. These two signal portions enter two reflection amplifiers of the push-push oscillator, locking the signal already generated by the push-push oscillator. The locked signal has the same stability and noise characteristics as the reference signal.

Additionally provided, in accordance with a preferred embodiment of the present invention, is imaging radar apparatus comprising a reference signal generator, at least one transmitter/receiver module as above, and radiating apparatus cascaded with a chain comprising the reference generator and at least one transmitter/receiver module.

Further in accordance with a preferred embodiment of the present invention, the transmitter receiver module comprises at least one level of push-push oscillators.

Further in accordance with a preferred embodiment of the present invention, the receiving functionality comprises a direct balanced down converter.

Still further in accordance with a preferred embodiment of the present invention, the reference signal generator comprises only two levels of push-push oscillators.

Additionally in accordance with a preferred embodiment of the present invention, the reference signal generator comprises at least first and second levels of push-push oscillators.

Also provided, in accordance with a preferred embodiment of the present invention, is a method for generating a reference signal for radar imaging, the method comprising cascading a quartz oscillator with at least one level of push-push oscillators.

Also provided, in accordance with a preferred embodiment of the present invention, is a method for generating a radar transmitter/receiver module of a phased array antenna comprising providing at least one level of push-push oscillators and a receiving functionality.

Additionally provided, in accordance with a preferred embodiment of the present invention, is a radar imaging method comprising cascading a reference signal generator comprising a quartz oscillator and at least first and second levels of push-push oscillators, a phased array antenna comprising at least one transmitter/receiver module, and radiating apparatus.

Further in accordance with a preferred embodiment of the present invention, the quartz oscillator is cascaded with a plurality of levels of push-push oscillators.

Additionally provided, in accordance with a preferred embodiment of the present invention, is a method for injection locked push-push oscillation comprising dividing a received reference signal having stability and noise characteristics into a first portion and a second portion which is delayed by an odd multiple of 180 degrees relative to the first portion; and employing a push-push oscillator to receive the first and second portions and generate therefrom a locked signal having the stability and noise characteristics of the reference signal.

Further in accordance with a preferred embodiment of the present invention, the method also comprises cascading a reference signal generator and radiating apparatus with the at least one level of push-push oscillators.

Additionally in accordance with a preferred embodiment of the present invention, the transmitter receiver module comprises at least one level of push-push oscillators.

Further in accordance with a preferred embodiment of the present invention, at least one level of push-push oscillators comprises more than one push-push oscillator Still further in accordance with a preferred embodiment of the present invention, at least one level of push-push oscillators comprises only two levels of push-push oscillators.

Further in accordance with a preferred embodiment of the present invention, at least one individual level of push-push oscillators comprises more than one push-push oscillators.

Also provided in accordance with a preferred embodiment of the present invention, is a radar imaging method comprising using a cascade comprising a reference signal generator comprising a quartz oscillator and at least first and second levels of push-push oscillators, a phased array antenna comprising at least one transmitter/receiver module, and radiating apparatus to generate a radar image.

Also provided, in accordance with a preferred embodiment of the present invention, is a radar imaging method comprising using a cascade comprising a reference signal generator, a phased array antenna comprising at least one transmitter/receiver module comprising at least one level of push-push oscillators, and radiating apparatus to generate a radar image.

BRIEF DESCRIPTION OF THE DRAWINGS

Preferred embodiments of the present invention are illustrated in the following drawings:

FIG. 13 is an example of a suitable layout for any of the radiator arrays of FIGS. 5 and 6A.

DETAILED DESCRIPTION OF PREFERRED EMBODIMENTS

Figure 1:
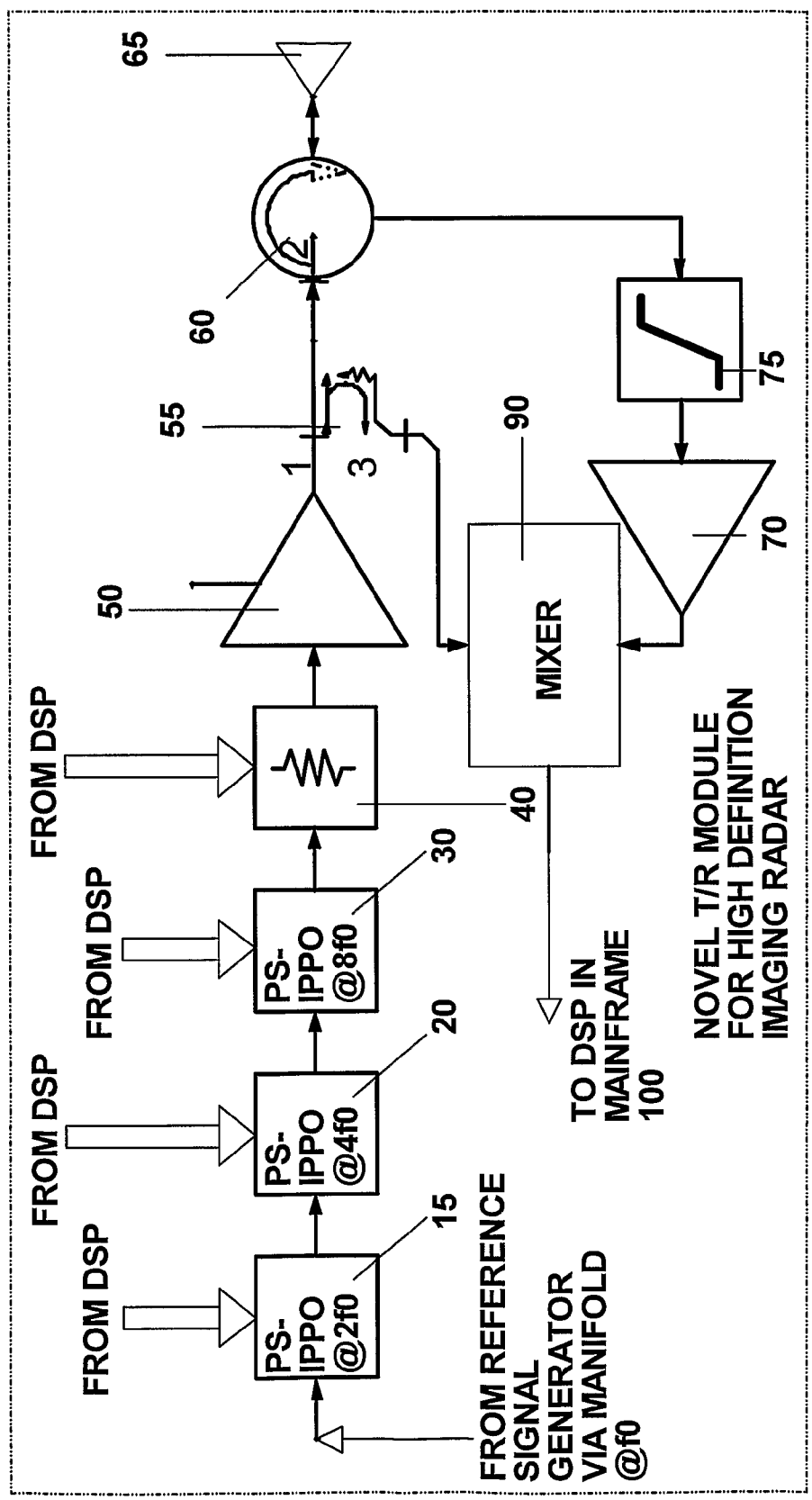
FIG. 1 is a simplified block diagram illustration of a push-push oscillator based transmitter/receiver module, suitable for high definition radar imaging applications.

FIG. 1 is a simplified block diagram illustration of a push-push oscillator-based transmitter/receiver module for high definition imaging radar. The term "high definition" is used herein to denote apparatus suitable for airborne radar applications and other applications which require considerable precision. The apparatus of FIG. 1 includes a reference signal generator 10, a cascade of at least one (three, in the illustrated embodiment) injection locked push-push oscillators 15, 20 and 30 each receiving a signal at a given frequency and delivering a signal at an even multiple of the frequency of the injected signal (twice the incoming frequency in the illustrated embodiment), and each having a specific phase in accordance with system requirements, as described herein in detail; a digital tuned attenuator 40, a power amplifier 50, a coupler 55 to sample part of the transmitted power to be used as local oscillator by a mixer 90, also termed herein a "balanced direct down converter", a circulator 60, a radiator 65, a receiver protector 75 and a low noise amplifier 70. The mixer 90 typically outputs to a conventional digital signal processor (not shown).

Figure 3:
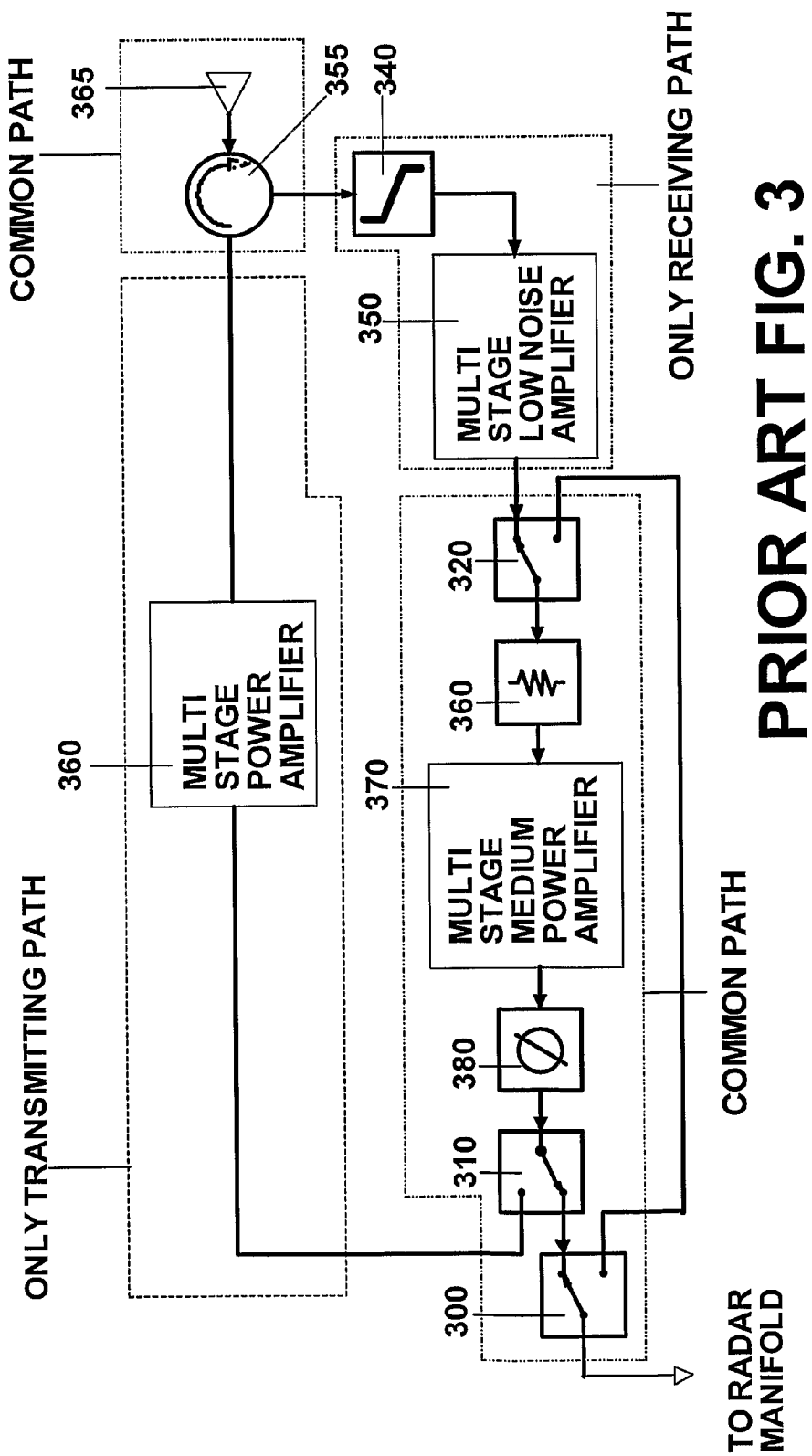
FIG. 3 is a simplified block diagram illustration of a conventional high definition transmitter/receiver module.

The T/R module of FIG. 1 preferably forms part of a phased array antenna for high definition Imaging Radar. Among several other advantages, it eliminates the loss caused, in a conventional T/R module, by the phase shifter. The transmitting path of the T/R module of FIG. 1, according to a preferred embodiment of the present invention, comprises a chain of 3 injection locked push-push oscillators 15, 20 and 30; a digital tuned attenuator 40, a power amplifier 50, a coupler 55, a circulator 60 and a transmitting radiator 65. In contrast, as shown in FIG. 3, the transmitting path in conventional high-definition systems typically comprises three switches, (300, 310, 320), a digitally tuned attenuator 360, a multi-stage medium power amplifier 370, a phase shifter, a power amplifier, a circulator 355 and a radiator 365. The 3 switches, the phase shifter, the multi-stage medium power amplifier and the digitally tuned attenuator are typically common to the transmitting and receiving paths in conventional systems.

When the system is performing the full phase scan, each of the oscillators of FIG. 1 typically operates within a range which is much narrower than the pulling band which generates a safely locked operating condition.

At the output of the injection locked phase shifted push-push oscillator chain of FIG. 1, a radiator 65 is connected to radiate the RF signal, with the appropriate phase shift.

Figure 4:
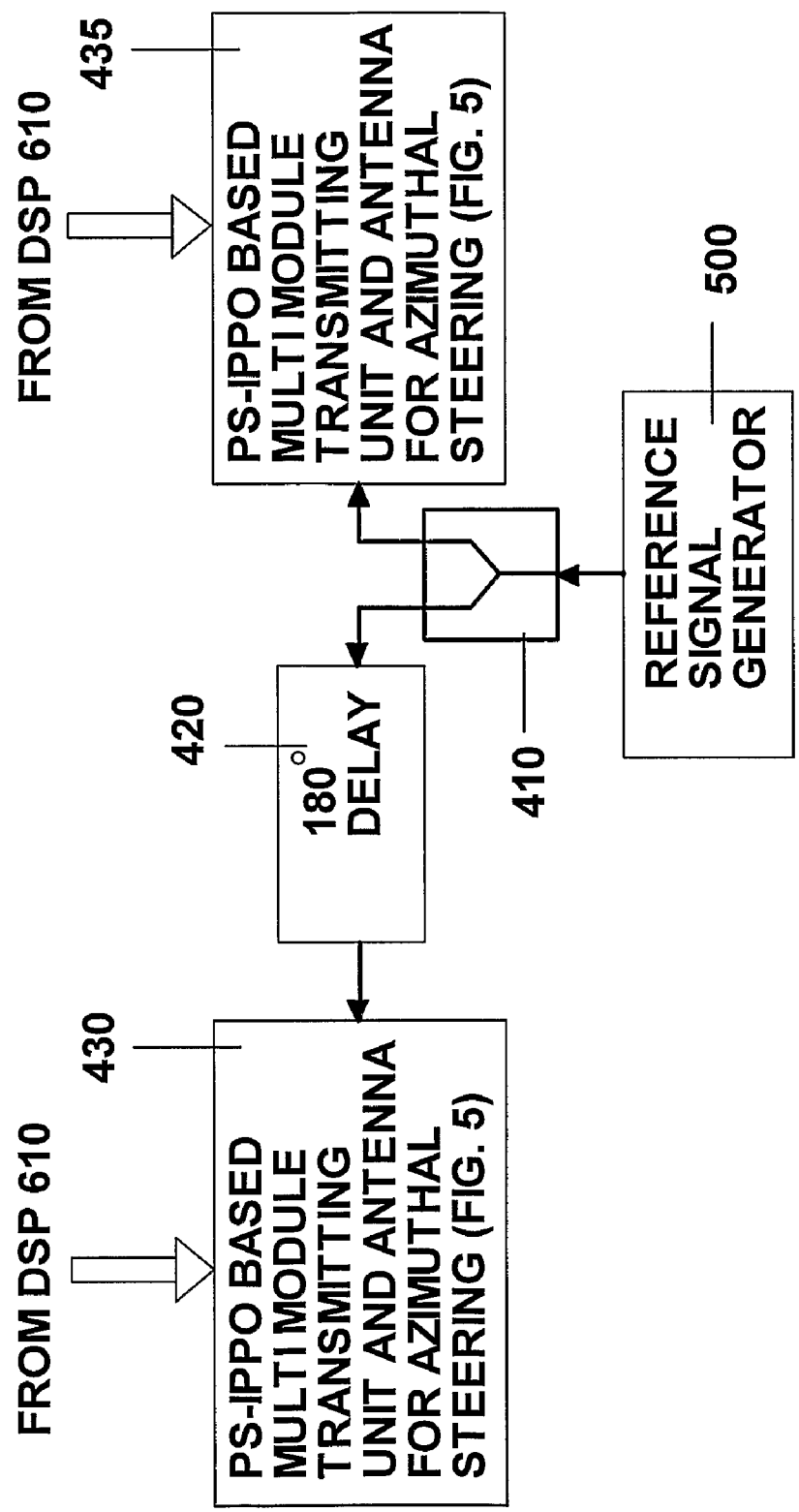
FIG. 4 is a simplified block diagram illustration of an injection locked push-push oscillator based transmitter subsystem, suitable for commercial applications such as but not limited to automatic driving, in which a phase array antenna wavefront is to be steered both in azimuth and elevation.

According to a first embodiment of the present invention suitable for high definition applications, the RX radiator is typically one and the same as the TX radiator (both denoted by reference numeral 65), and the combined radiator is operated by the circulator 60, and by switching suitably between TX and RX. According to a second embodiment of the present invention suitable for commercial applications, the TX antenna of the transmitting subsystem of FIG. 4 is typically located adjacent the RX antenna of the receiving subsystem of FIG. 6A, typically at the closest distance at which the transmitter does not significantly affect the receiver.

Figure 2:
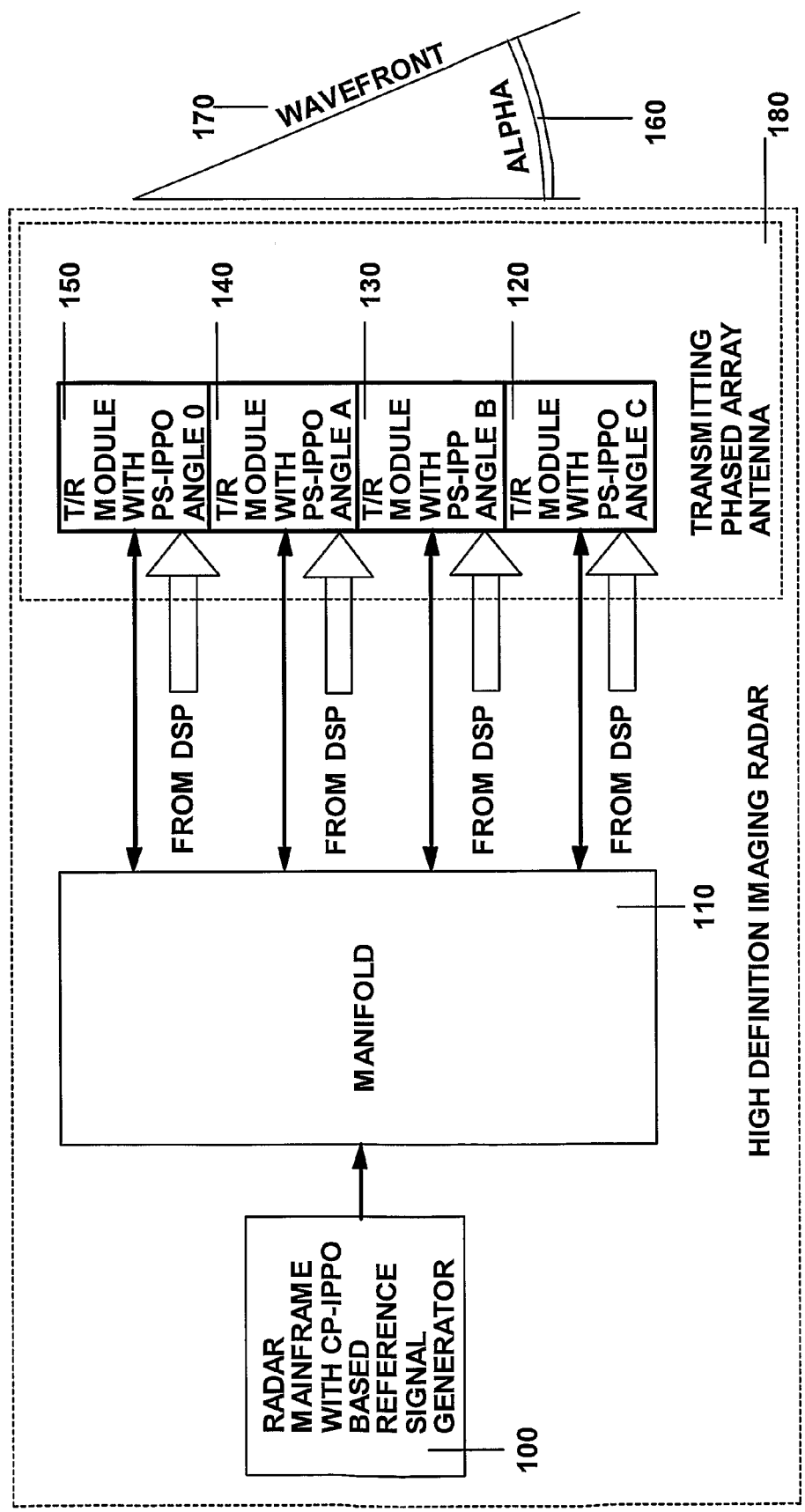
FIG. 2 is a simplified block diagram illustration of high definition imaging radar apparatus based on an active phased array antenna which includes an array of transmitter/receiver modules such as but not limited to the transmitter/receiver modules of FIG. 1.

FIG. 2 is a simplified top-level block diagram illustration of apparatus for imaging radar including a radar mainframe 100, a manifold 110, and a phased array antenna 180 typically comprising an array of transmitter/receiver modules 120, 130, 140 and 150. Each T/R module may be constructed and operative as shown in FIG. 1, or alternatively may be a conventional T/R module e.g. as shown and described below with reference to prior art FIG. 3. The wavefront of the apparatus of FIG. 2 is denoted by reference numeral 170. The steering angle ALPHA is denoted by reference numeral 160.

FIG. 3 is a simplified block diagram illustration of a conventional (prior art) transmitter/receiver module including first, second and third switches 300, 310 and 320 which select either a transmitting path or a receiving path. The selection shown in FIG. 3, indicated by the specific position of the three switches, is the receiving path. The receiving path comprises a radiator 365, a circulator 355, a receiver protector 340, a multistage low noise amplifier 350, the third switch 320, a digitally tuned attenuator 360, a typically multi-stage medium power amplifier 370, a phase shifter 380, switch 310 and switch 300. The transmitting path comprises the first switch 300, the second switch 320, a digitally tuned attenuator 360, a typically multi-stage medium power amplifier 370, the phase shifter 380, the second switch 310, a typical multi-stage power amplifier 360, the circulator 355 and the radiator 365.

Phased array antennas generally comprise an array of radiators, each one connected to a T/R module, radiating a signal with a specific phase, related to a given phase reference. In conventional T/R modules, the component which is operative to change the phase of the radiated signal, is a circuit termed a "phase shifter". There are several configurations for the phase shifter component all of which are expensive to produce, particularly in MMIC technology. In conventional systems, as shown in FIG. 3, the input signal to the T/R module has the same frequency as the radiated signal. Among other disadvantages present in a conventional T/R module, as described hereinbelow, the "manifold" (distribution network of the signal to the various T/R modules) is adversely affected by an appreciable power loss, which is an increasing function of the operating frequency. The size and the weight of the manifold are also disadvantages in conventional airborne high definition phased array antennas.

The high frequency of the signal fed into the conventional T/R module results in the main frame of conventional radar systems being forced to incorporate expensive circuitry having relatively high DC power consumption, such as PLL controlling high frequency oscillators, frequency prescalers, and power amplifiers. Each T/R module, in addition to operating the phase shift, also preferably performs the function of increasing the power of the signal received at its input port.

In conventional T/R modules, due to the presence of the phase shifter, the phase shifter's loss, typically of the order of 5-7 dB, needs to be recovered, thereby reducing efficiency.

In radar "Frequency Agility" operations, the beam focus of the Radiation Pattern of the antenna (which determines the ability of the system to adequately track its target), is adversely affected by the non-linearity of the phase shifter versus frequency. Mainly in high frequency, and in MMIC technology, the screening of the components lowers the production yield of the item, thereby increasing its production cost. The power loss related to the phase shifter, when switched to the receiving path, reduces the system's Third Harmonic Intercept Point, (IP3). The power loss related to the manifold, switched to the receiving path, further reduces the system's efficiency.

FIG. 4 is a simplified block diagram illustration of an injection locked push-push oscillator based transmitter subsystem, operative to steer a phased array antenna wavefront in both azimuth and elevation in commercial applications such as but not limited to automatic driving. The circuitry includes a reference signal generator 400, and multi-module transmitting units 430 and 435. Unit 435 receives an input signal at the same power and frequency as does transmitting unit 435, but with a 180 degree phase shift introduced by 180 degree delay unit 420. The DSP 610 (FIG. 6A) operatively associated with the transmitter subsystem of FIG. 4 and the receiver subsystem of FIG. 6A provides azimuth steering information obtained from the transmitting units 430 and 435 of FIG. 4 and computes elevation steering information.

Figure 6A:
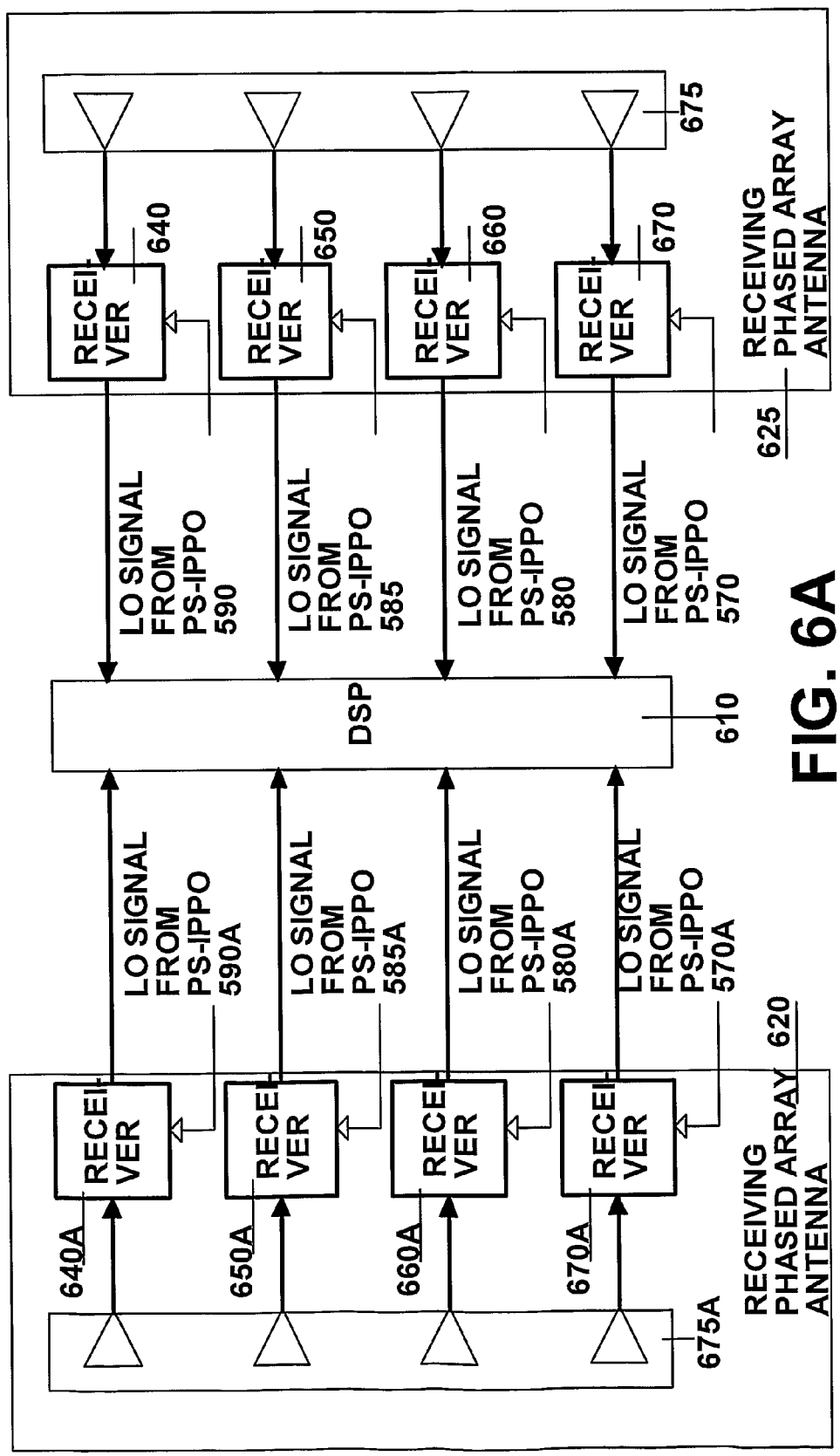
FIG. 6A is a simplified block diagram illustration of a receiver subsystem which, in conjunction with the transmitter circuitry of FIG. 5, forms an imaging radar system suitable for commercial applications such as but not limited to automatic driving.

The apparatus of FIGS. 4 and 6A, taken together, form a complete phased array antenna system for imaging radar, suitable for commercial applications such as but not limited to automatic driving applications.

Separation of the TX modules and antenna (FIG. 4) from the RX modules and antenna (FIG. 6A) is believed to yield the most cost effective solution for commercial systems such as FMCW (frequency modulated continuous wave) systems, for automatic driving.

Figure 6B:
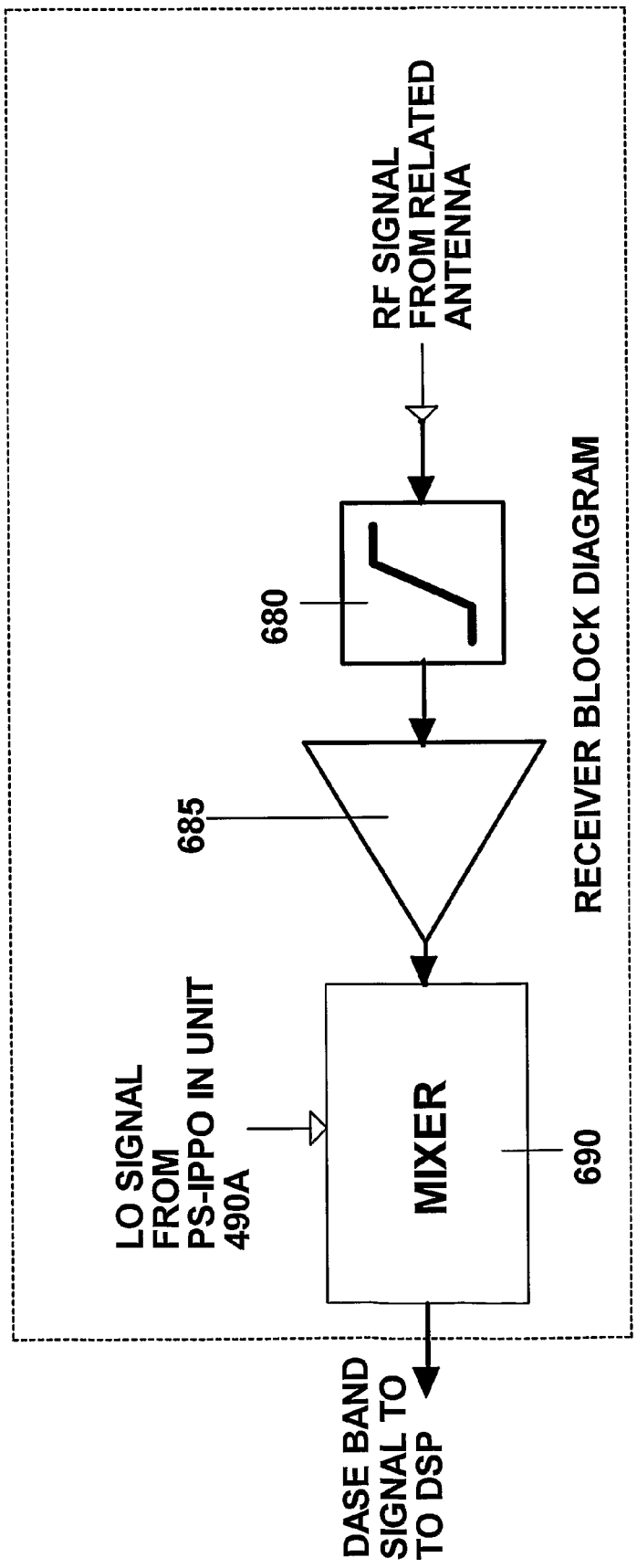
FIG. 6B is a simplified block diagram illustration of an individual one of the receivers of FIG. 6A.

The apparatus shown and described herein preferably simplifies the receiving path of the T/R module, by demodulating the received signal immediately after the radiator, using a direct conversion mixer. Each receiving path, according to a first embodiment of the present invention suitable for commercial applications, includes a receiving antenna and a direct down converter as shown in FIGS. 6A-6B.

Figure 5:
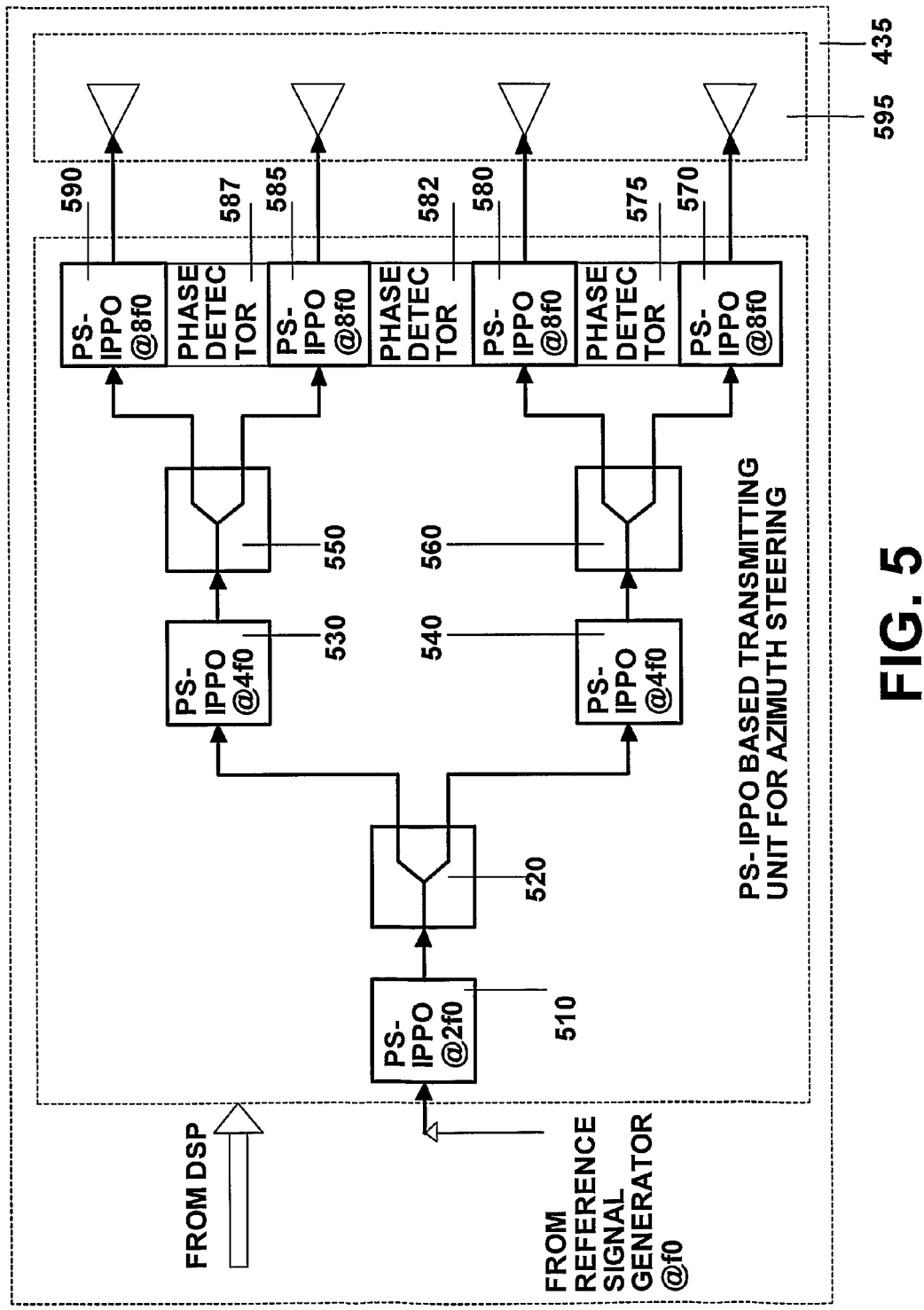
FIG. 5 is a simplified block diagram illustration of one of the injection locked push-push oscillator-based transmitting unit of FIG. 4 which is operative to perform azimuthal steering in commercial applications such as but not limited to automatic driving.

FIG. 5 is a simplified block diagram illustration of either of the transmitting units 430 and 435 of FIG. 4, constructed and operative in accordance with a preferred embodiment of the present invention. Units 430 and 435 receive signals identical in power level and frequency but with phases of 0 and 180 degrees respectively, as shown in FIG. 4. Each comprises an injection locked push-push oscillator-based transmitter typically operative to perform only azimuthal steering in commercial applications such as automatic driving. As shown, a plurality of stages of push-push oscillators may be employed, at least one of the stages including more than one push-push oscillator. In the illustrated embodiment, three stages of push-push oscillators are provided, the first including a single oscillator 510, the second including two oscillators 530 and 540 and the third including four oscillators 570, 580, 585 and 590.

Figure 7:
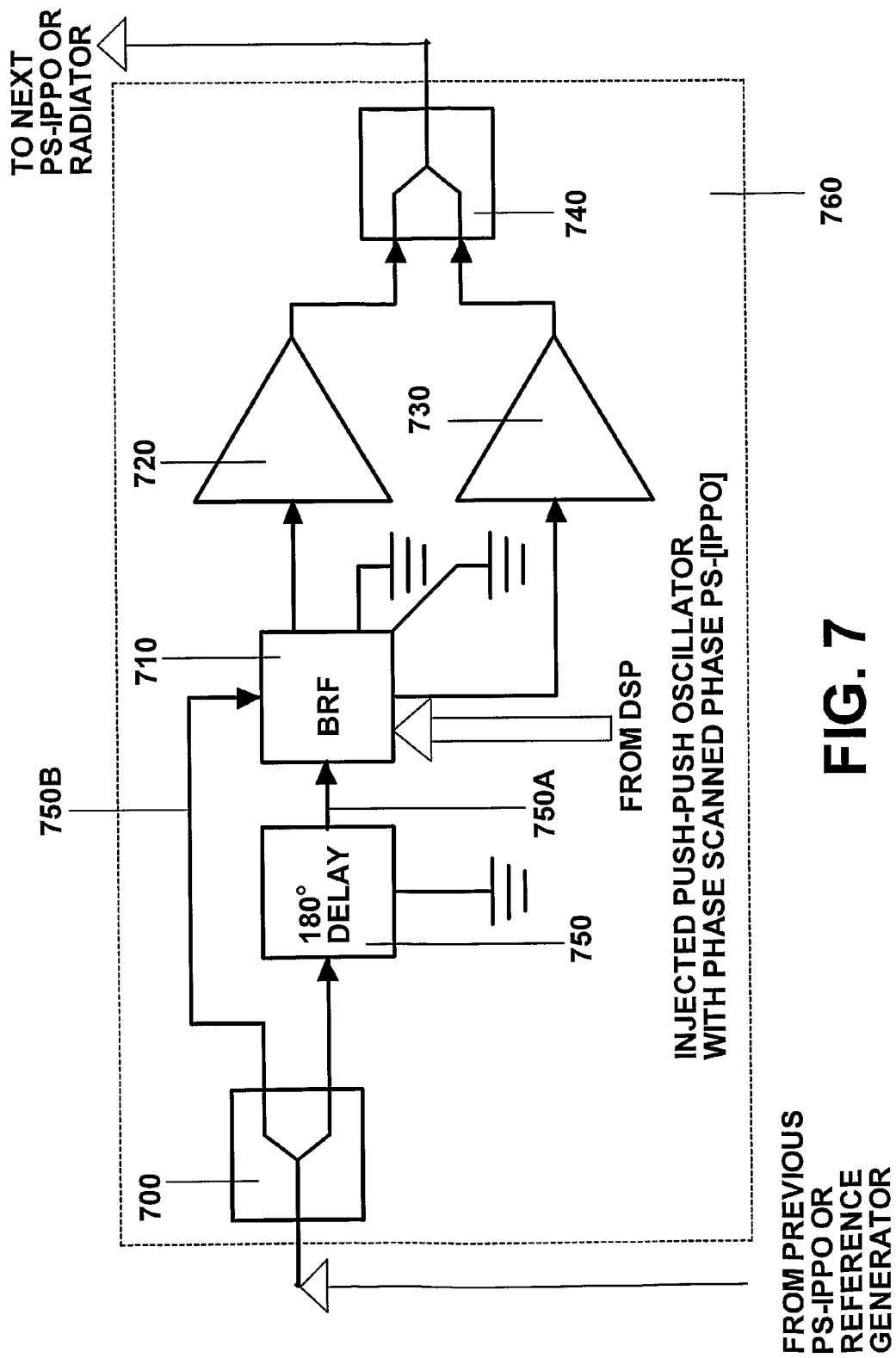
FIG. 7 is a simplified block diagram illustration of a phase-scanned injection locked push-push oscillator (PS-IPPO) constructed and operative in accordance with a preferred embodiment of the present invention and suitable for implementing the phase-scanned IPPOs of FIGS. 1 and 5.

All of the injection locked push-push oscillators (IPPOs) in the apparatus of FIG. 5 are typically phase scanned (PS) and may comprise the phase-scanned IPPO of FIG. 7. The phase shift generated in the present invention is analogical. As such, it can be affected by phase drift due to component aging or fluctuation in temperature. In order to secure a focused radiation pattern beam of the TX antenna, based on the injection locked push-push oscillators (IPPOs), the phase of the last circuit of the chain of each TX module (e.g. modules 570, 580, 585, and 590 of FIG. 5) is periodically compared and aligned to a reference phase (e.g. the phase of the signal of module 590 of FIG. 5), using a phase detector, typical behavior of which is graphed in FIG. 16. For example, in FIG. 5, the phase of the signal radiated by PS-IPPO 585 may be compared, and aligned, to the reference signal of PS-IPPO 590 by phase detector 587. Subsequently, the phase radiated by PS-IPPO 580 may be compared, and aligned, to the new reference, namely the phase of PS-IPPO 585, by phase detector 582. Subsequently, the phase radiated by PS-IPPO 570 may be compared, and aligned, to the latest reference, namely the phase of PS-IPPO 580, by phase detector 575. Typically, the resulting feedback is employed, periodically and/or as necessary, e.g. once a minute, to restore the focus of the radiated beam.

The phase detectors 575, 582, and 587 of FIG. 5 may have the same basic structure as the balanced direct down converters of FIG. 11 or 12 described hereinbelow. However, they are typically differently tuned. Whereas the converters of FIGS. 11 and 12, described below, are tuned by converting RF signals into baseband signals, the phase detectors of FIG. 5 are tuned to detect the phase between the two RF input signals having the same frequency. Each phase detector in FIG. 5 receives a pair of same-power, same-frequency RF signals that may differ in phase.

The receiver subsystem of FIG. 6A makes use of a sampled portion of the signal, generated by a homologous transmitter, as pump for the transmitter's corresponding mixer.

Each one of the receivers 640, 650, 660 and 670 typically comprises a receiver protector 680, followed by a low noise amplifier (LNA) 685 and a balanced direct conversion mixer 690 as shown in FIG. 6B. Suitable circuitries for the balanced direct conversion mixer 690, according to two alternative embodiments of the present invention, are shown in FIGS. 11 and 12 below, respectively.

In the embodiment of FIG. 6A, the pump for each RX module is typically sampled from the corresponding (homologous) TX module. The term "LO signal" refers to the local oscillator signal of the corresponding receiver (640, 650, 660 or 670). The output from the RX module is directly at base band, and is fed into a digital signal processor (DSP) 610.

The DSP elaborates the data from the echo of the radar, and generates the information for imaging operations. A screen display (not shown) typically displays the image of the target.

Figure 15:
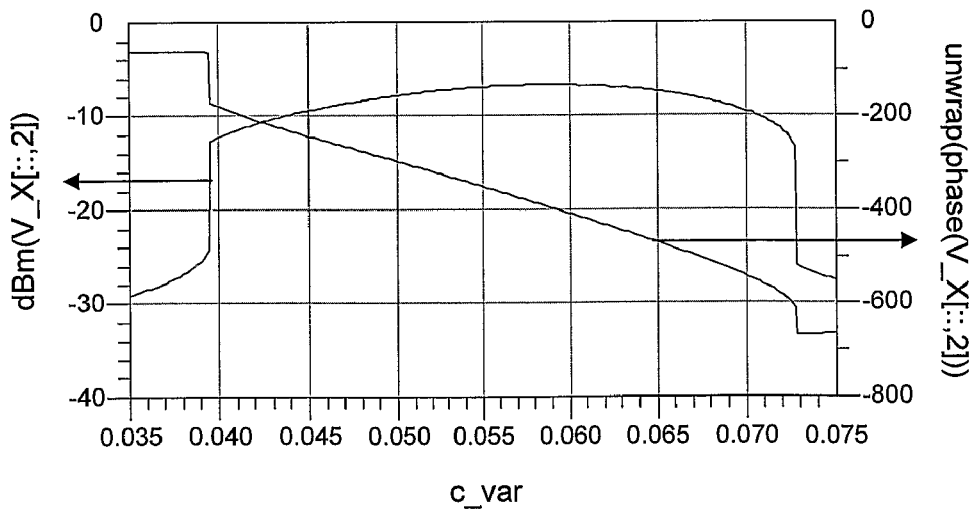
FIG. 15 is an example of a graph representing the phase shift, within the pulling band, of one of (the last of) the injection locked push-push oscillators of FIG. 1.

FIG. 7 is a simplified block diagram illustration of a phase-scanned injection locked push-push oscillator (PS-IPPO) constructed and operative in accordance with a preferred embodiment of the present invention. The phase-shifted push-push oscillator of FIG. 7, constructed and operative in accordance with a preferred embodiment of the present invention, has characteristics specifically tailored to the functionality of a T/R module. Specifically, each phase-shifted injection locked push-push oscillator of the present invention (e.g. oscillators 15, 20 and 30 of FIG. 1; oscillators 510, 530, 540, 570, 580, 585 and 590 of FIG. 5) typically receives an injecting RF signal, multiplies its frequency by a factor of 2*N, where N is an integer, as shown in FIG. 15, and changes its phase thereby inherently enhancing the phase scan of the system. The stability of the output signal is typically the same as the stability of the injecting signal and the output signal's noise spectrum typically degrades only slightly due to the frequency multiplication.

Figure 8:
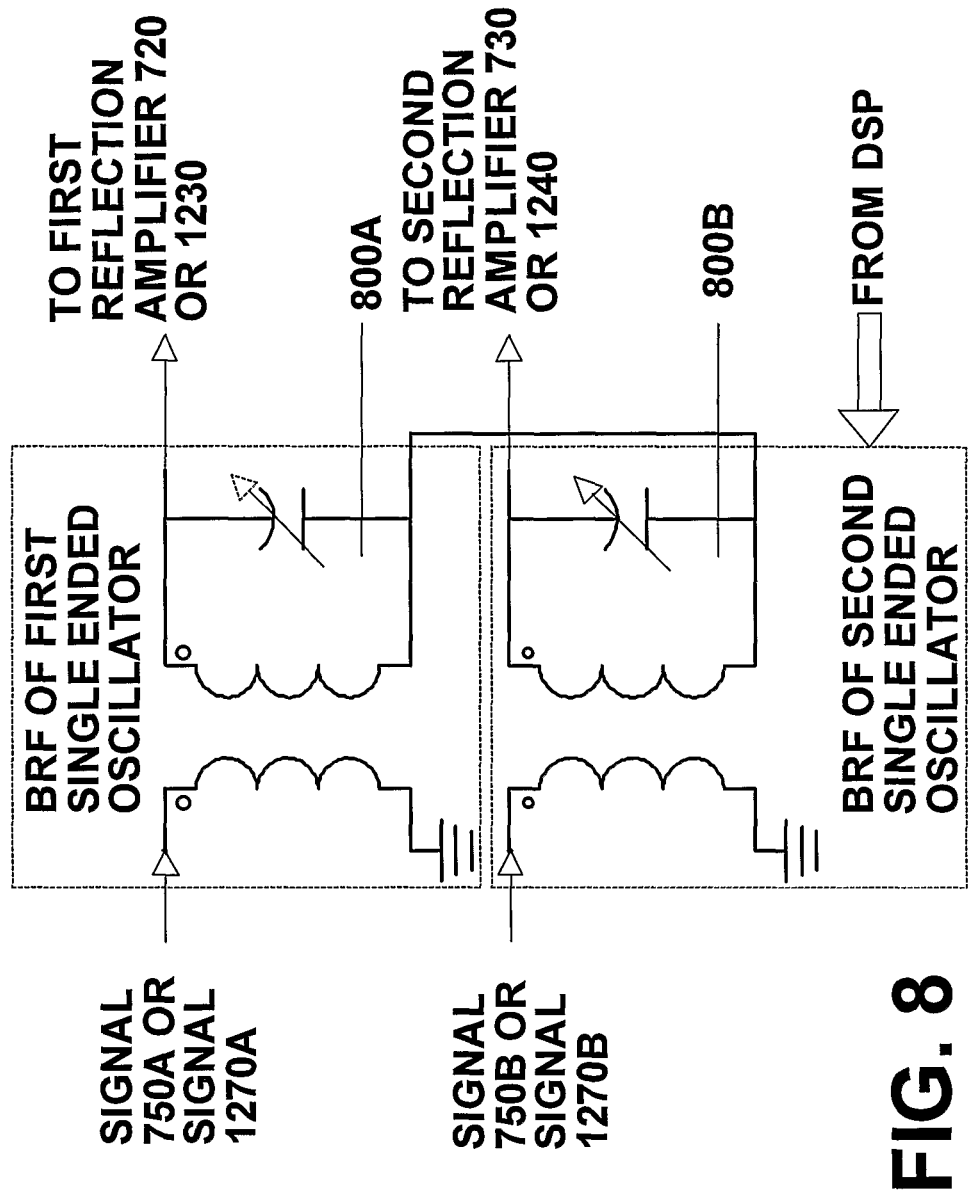
FIG. 8 is a simplified block diagram illustration of the composite band rejection filter (BRF) of FIGS. 7 and 10, constructed and operative in accordance with a preferred embodiment of the present invention.
Figure 10:
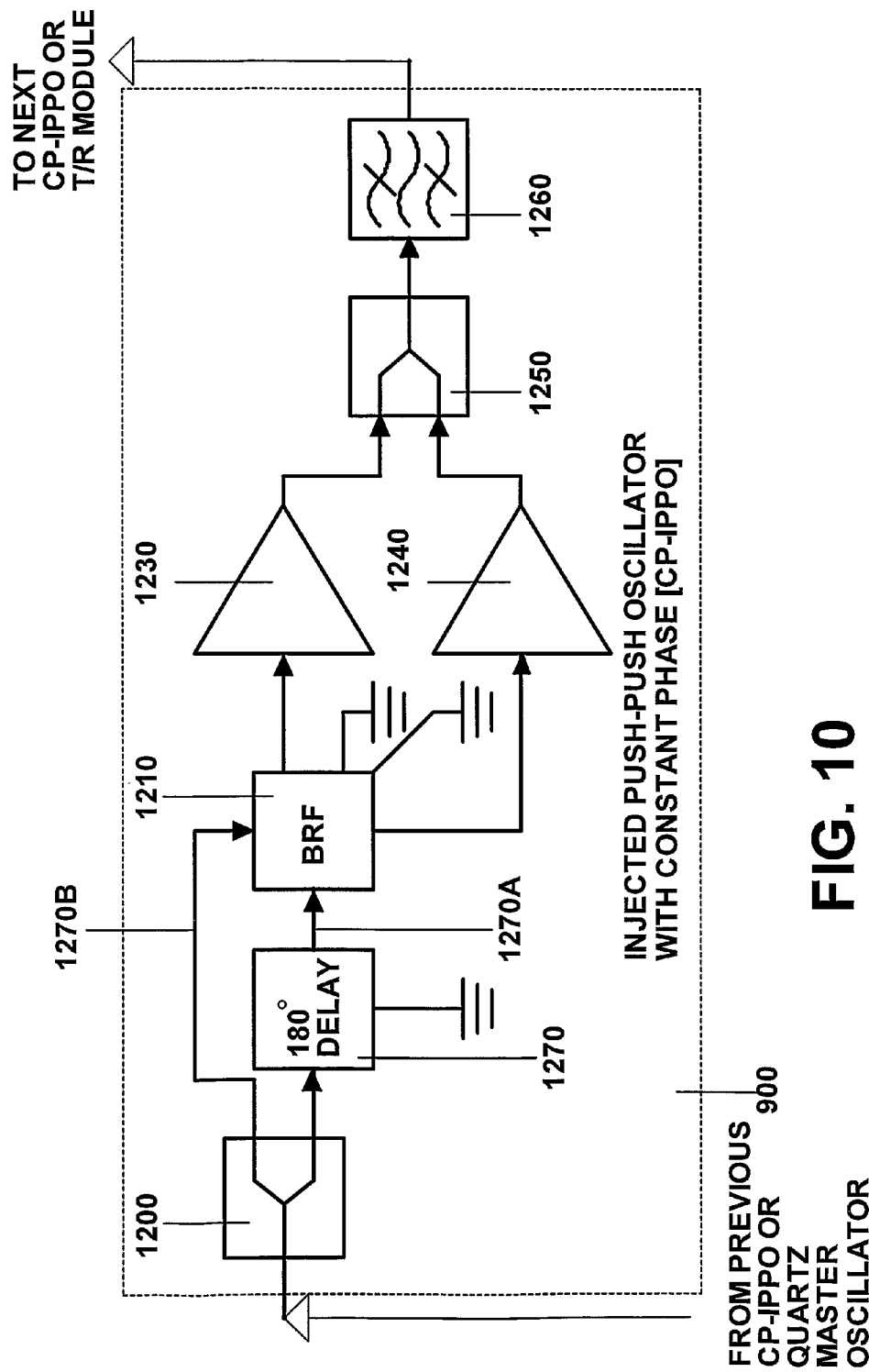
FIG. 10 is a simplified functional block diagram of one of the constant phase injection locked push-push oscillators (CP-IPPOs) of FIG. 9.

FIG. 8 is a simplified block diagram illustration of the composite BRF for injection block 710 of FIGS. 7 and 10, constructed and operative in accordance with a preferred embodiment of the present invention.

Figure 9:
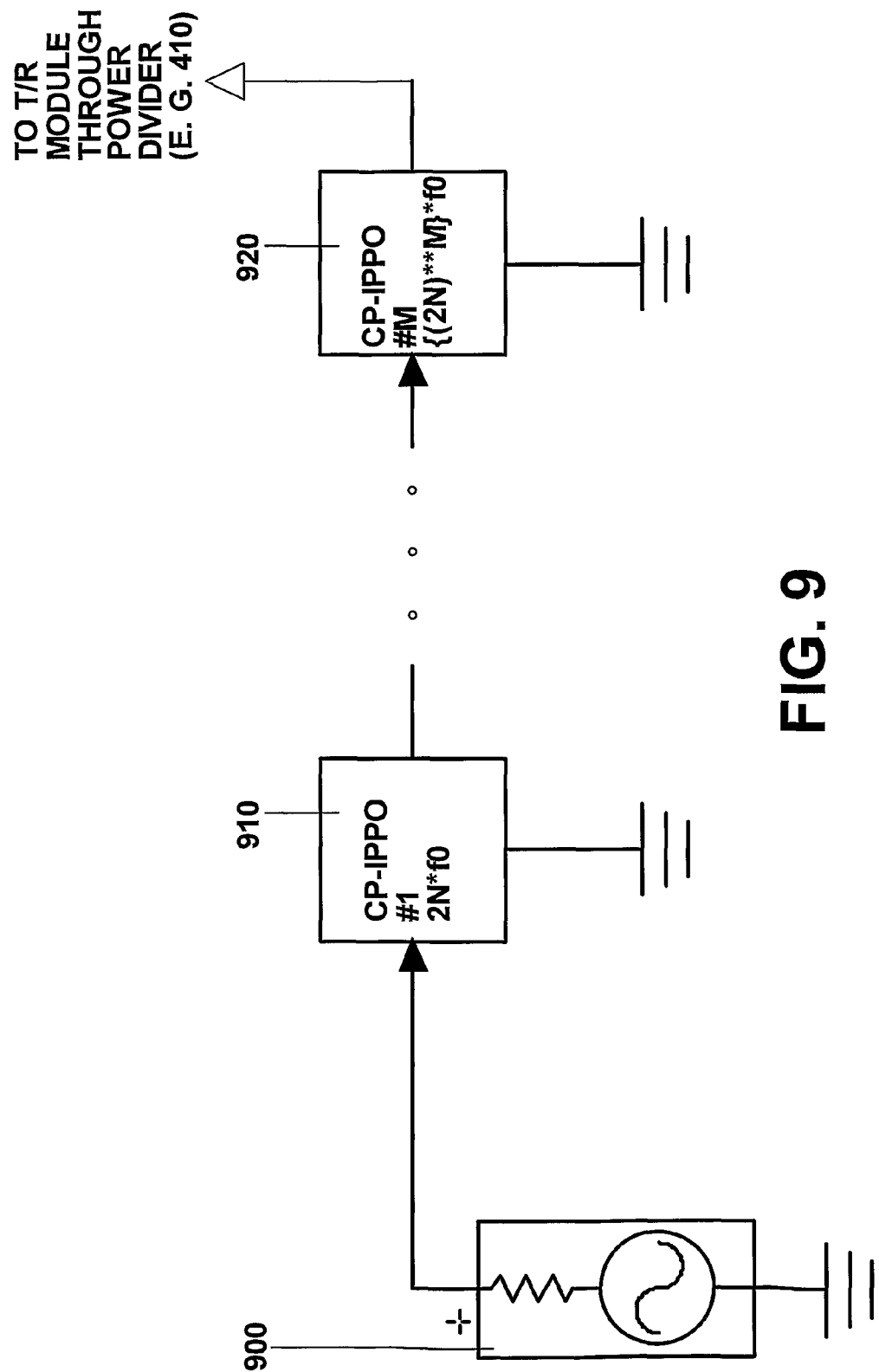
FIG. 9 is a simplified functional block diagram of the reference signal generator of FIG. 1 or 4, constructed and operative in accordance with a preferred embodiment of the present invention and including one or more constant phase injection locked push-push oscillators.

FIG. 9 is a simplified functional block diagram of the reference signal generator of FIG. 1 or 4, constructed and operative in accordance with a preferred embodiment of the present invention and including one or more constant phase injection locked push-push oscillators (CP-IPPOs) 910 . . . , 920. The output of the last CP-IPPO 920 is injected into a T/R module constructed and operative in accordance with a preferred embodiment of the present invention. A preferred embodiment of the present invention comprises two chains of push-push oscillators constructed and operative in accordance with a preferred embodiment of the present invention, as shown respectively in FIG. 1 (phase shifted IPPOs 15, 20 and 30) and FIG. 9 (constant phase IPPOs 1, . . . M). Alternatively, only one of these chains may be employed.

As shown in FIG. 9, the master reference signal is generated by a quartz oscillator 900. The reference signal is characterized by very high stability and very low noise. A first chain of M push-push cascaded stages 910, . . . 920, used as constant-phase frequency multipliers, multiplies the frequency of the master signal by a maximum factor $(2*N)M$, where N is an integer, as shown below in FIGS. 10 and 17**.

In commercial applications, the T/R module's quartz master may work at UHF (ultra high frequency) e.g. 150.39 MHz: the reference signal inputting the T/R modules, after the frequency multiplication by the first chain of push-push circuits, may have a frequency of 9.625 GHz. The radiated signal frequency may reach the desired level, 77 GHz, after frequency multiplication by the second chain of PS-IPPOs. In order to achieve such a result, the first chain's parameters may be N=4 and M=2, while the parameters of the second chain may be N=1 and M=3, (multiplication factor=$\{(2*N)**M\}$).

If the above example parameters are used for the first and second chains of a high definition T/R module constructed and operative in accordance with a preferred embodiment of the present invention, the radiated frequency is e.g. 10 GHz, the reference signal inputting the T/R module is 1.250 GHz, and the frequency of the quartz master oscillator 19.53 MHz.

The very low operating frequency of all the above-described circuits results in a considerable saving in production cost for high definition imaging radar as well as higher system reliability, relative to conventional T/R modules. The push-push oscillator constructed and operative in accordance with a preferred embodiment of the present invention is convenient to cascade, so that no circulators are needed for isolating the stages, as requested by conventional frequency multipliers. The first chain of push-push oscillators 910, . . . 920 makes up the RF portion of the radar main frame.

FIG. 10 is a simplified functional block diagram of one of the constant phase injection locked push-push oscillators of FIG. 9. The apparatus of FIG. 10 comprises a power splitter 1200 typically operative to directly inject one half of the received power into a band rejection filter (BRF) 1210 and to inject the second half of the received power into the band rejection filter 1210 via a 180 degree delay unit 1270. A pair of reflection amplifiers 1230 and 1240 feed into a power combiner 1250 and a filter 1260. The filter may be tuned at 2*N*f0 where N is an integer such as 4.

Figure 11:
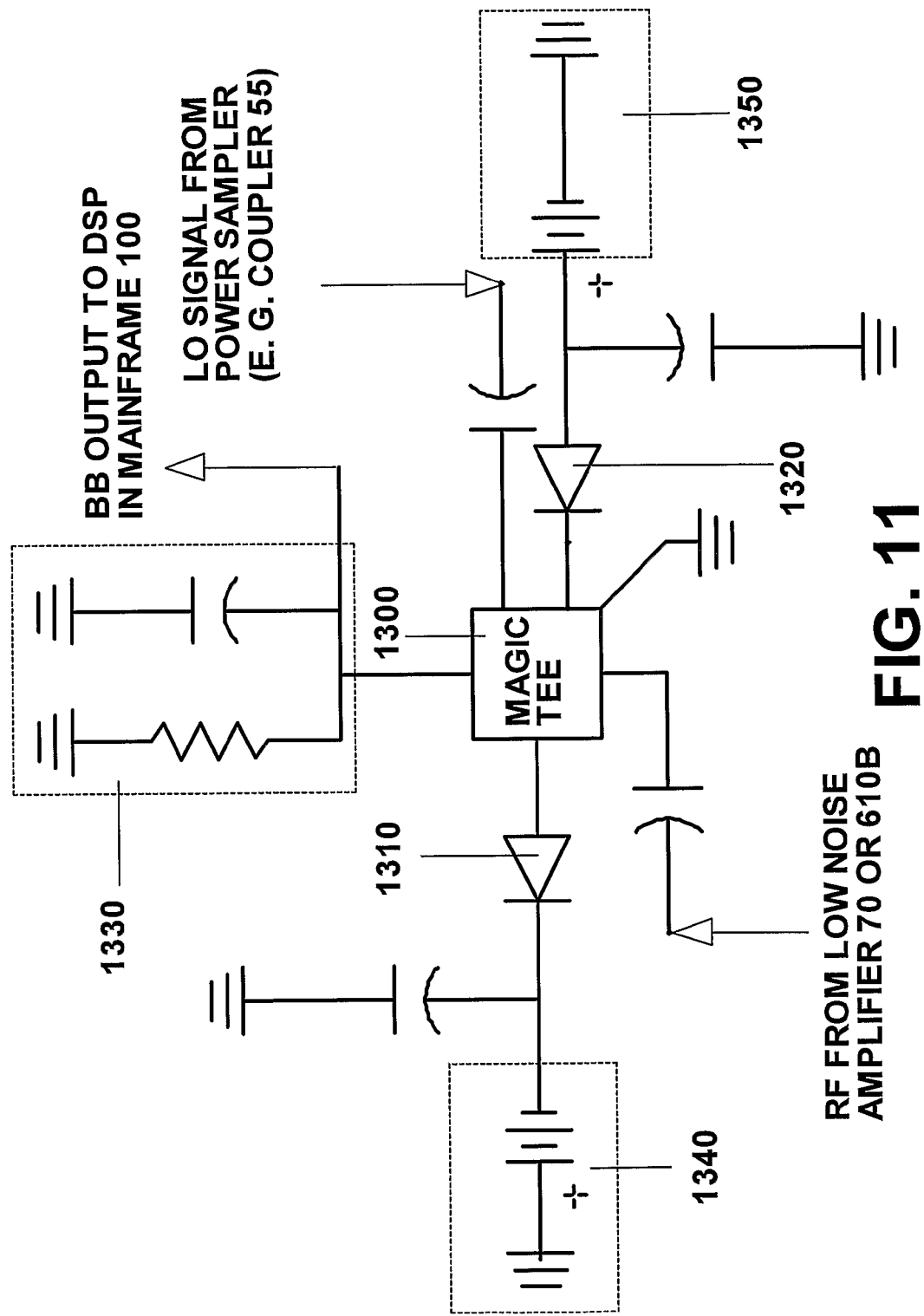
FIG. 11 is a simplified functional block diagram of a first embodiment of the balanced direct down converters of FIG. 1 or 6B.

FIG. 11 is a simplified functional block diagram of the direct down converter of FIG. 1 (90) or FIG. 6B (690), constructed and operative in accordance with a first embodiment of the present invention. The apparatus of FIG. 11 includes a rat race power divider 1300 (micro strip "magic tee"), two biased diodes 1310 and 1320, a filter 1330 feeding into an output DSP (digital signal processor), not shown.

Figure 12:
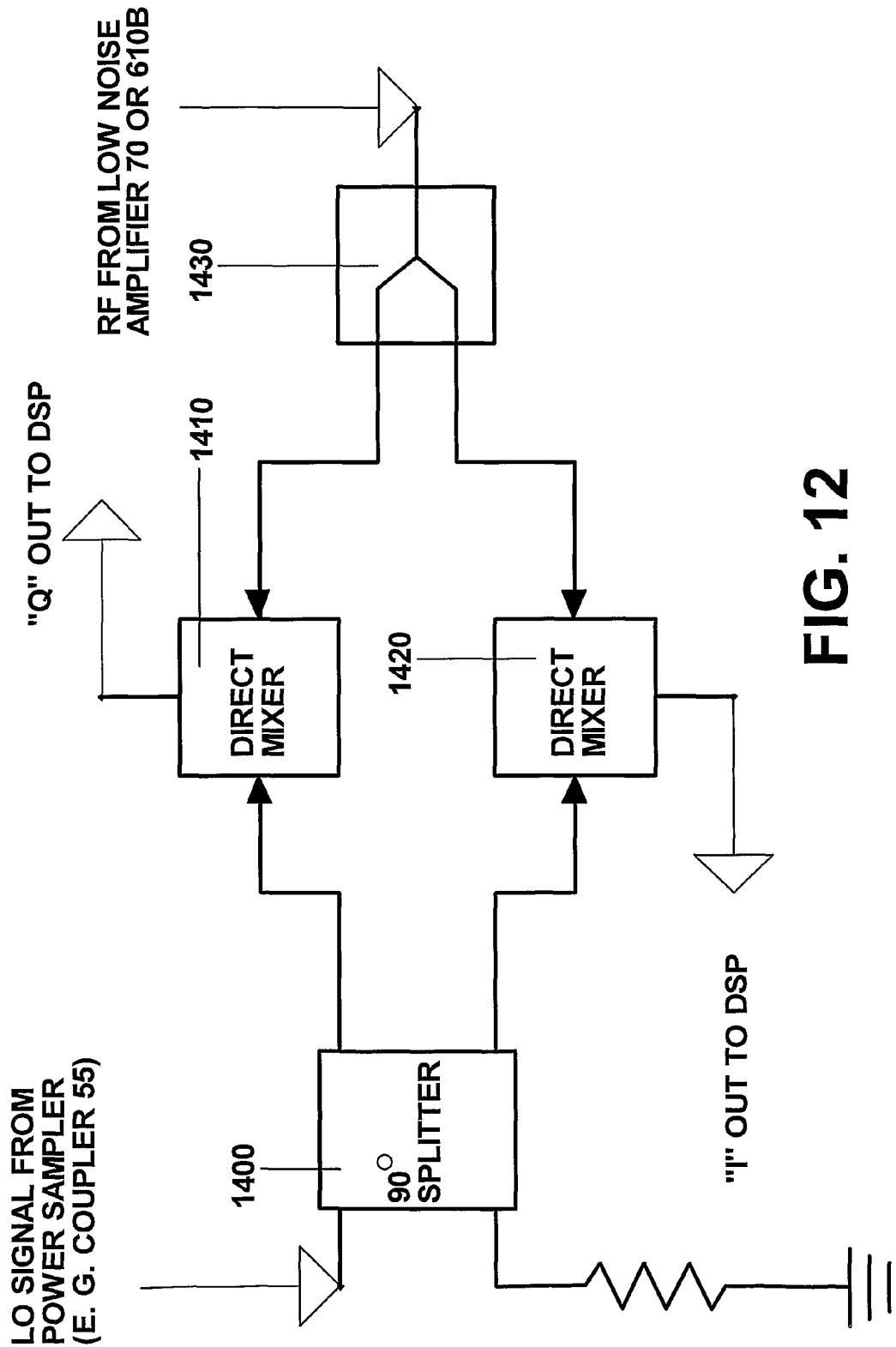
FIG. 12 is a simplified functional block diagram of an alternative embodiment of the balanced direct down converter of FIG. 1 or 6B.

FIG. 12 is an alternative, in-phase quadrature phase mixer (I/Q mixer) embodiment of the balanced direct down converter 90 of FIG. 1 or 690 of FIG. 6B. The apparatus of FIG. 12 comprises a 90 degree power divider 1400, a pair of balanced direct down converters 1410 and 1420 and a zero-degree power splitter 1430.

FIG. 13 is an example of a suitable layout for the radiator array 595 of FIG. 5, and/or for either or both of the radiator arrays 675 and 675A of FIG. 6A. In order to perform only azimuth steering of the transmitted beam, the signals to the connections A, . . . , H in FIG. 13 have the following phases respectively: 0, gamma, 2*gamma, 3*gamma, 180, 180+gamma, 180+2*gamma, 180+3*gamma. In order to perform only elevation steering, the signals to the same connections A-H have the following phases respectively: 0, 0, 0, 0, beta, beta, beta, beta. In order to perform any combined steering, a combination of the mentioned phases is used. Gamma and beta are antenna-dependent coefficients if very low side lobes of the radiation pattern are desired; in the illustrated embodiment, gamma may be between −125 degrees and 125 degrees whereas beta may be between −90 degrees and 90 degrees. If gamma is +/−125 degrees and beta is +/−90 degrees, the azimuth will be +/−32 degrees and the elevation angle will be +/−3 degrees, respectively.

Figure 14:
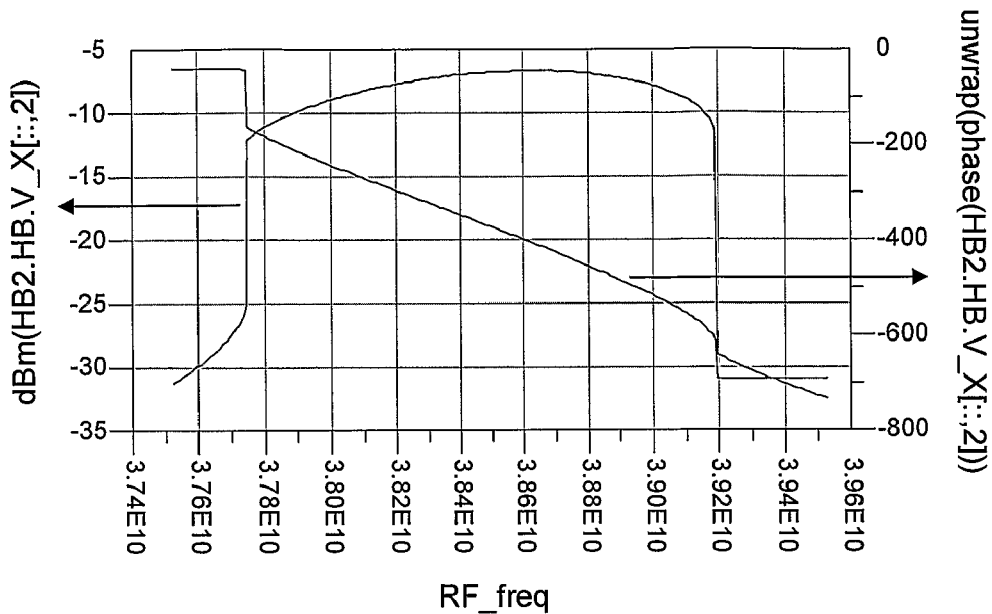
FIG. 14 is an example of a graph representing the phase shift, within the locking band, of one of (the last of) the injection locked push-push oscillators of FIG. 1.

FIG. 14 is an example of a graph representing the phase shift, within the locking band, of one of (the last of) the injection locked push-push oscillators of FIGS. 7 and 10, when the injected signal frequency is swept.

FIG. 15 is an example of a graph representing the phase shift, within the pulling band, of one of (the last of) the injection locked push-push oscillators of FIG. 7. The phase shift function of the injection locked push-push oscillator of the present invention is now described: Given a generic injection locked oscillator locked at f0, if the frequency of the injection locking signal is changed, the output frequency is then pulled by the reference signal. Out of the locking band, the circuit degrades to become a free running oscillator as shown in FIG. 14. Similarly, given a generic injection locked oscillator, locked at the aligned frequency f0, if the BRF of the circuit is tuned to a different frequency within the pulling bandwidth, the frequency of the output signal remains obviously the same, but the phase of the output signal changes as shown in FIG. 15.

The advantage of the injection locked push-push oscillator circuit based embodiment over single ended oscillators is the inherent frequency and the phase multiplication of the processed signal, which result in a smaller and less costly system as described above.

The inherent frequency multiplication makes the radar main frame cheaper, smaller and lighter, while the phase multiplication enhances the scan phase of the system and relieves the system of the expensive phase shifter circuit.

The push-push oscillator based embodiment described herein has major economical advantages even vis a vis a novel T/R module which might be based on single ended oscillators. In order to enhance the phase scan of a usual inject-locked single ended oscillator, a frequency multiplier should be cascaded to it. Because of the high criticality of the circuits involved, this operation requires a circulator, which is a large, costly component.

Figure 16:
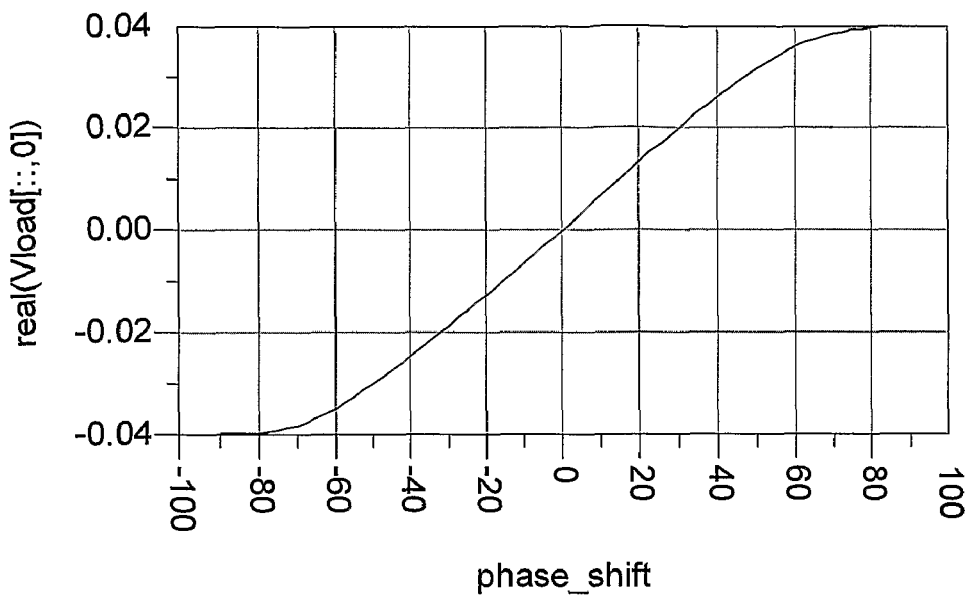
FIG. 16 is an example of a phase v. voltage graph for an individual one of the phase detectors of FIG. 5.
Figure 17:
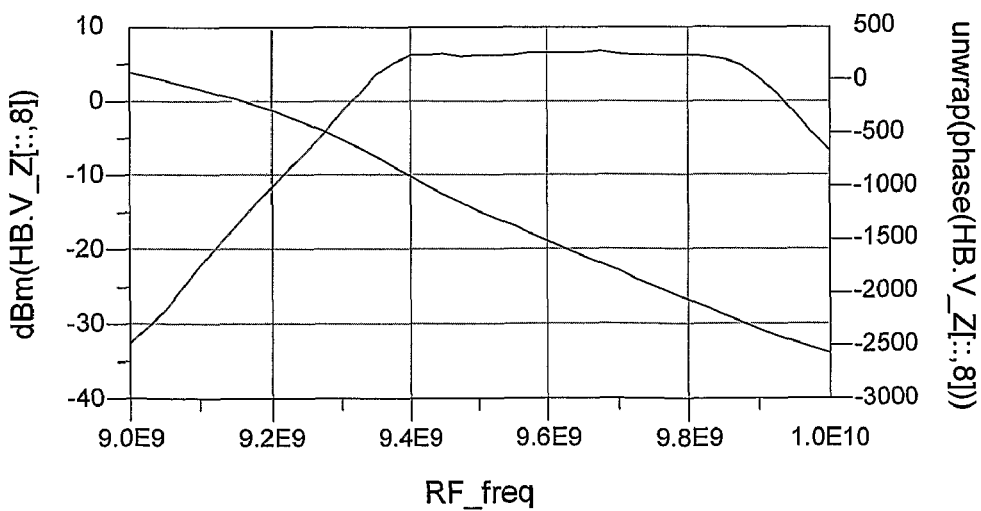
FIG. 17 is an example of a graph of the locking band of an individual one of the push-push oscillators in the reference signal generator of FIG. 9.
Figure 18:
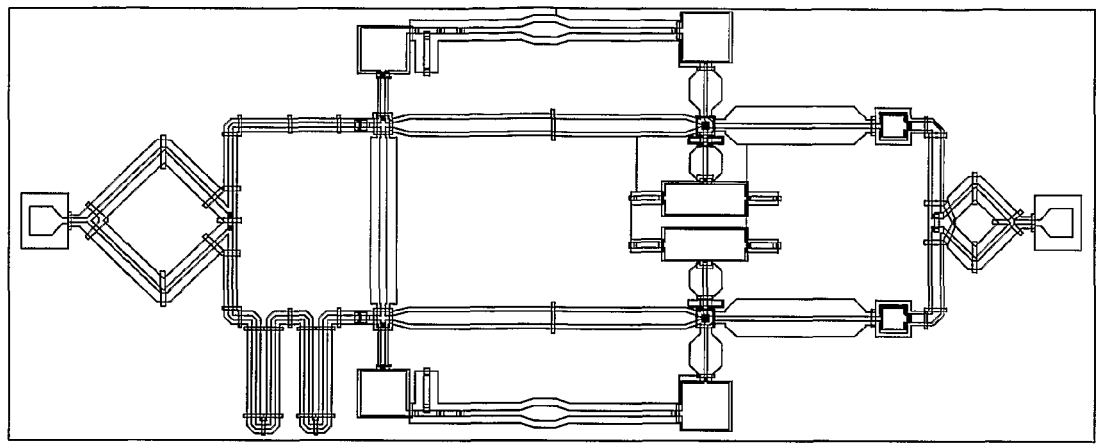
FIG. 18 is an example of a suitable layout for an injectable push-push oscillator.

FIG. 16 is an example of a phase v. voltage graph for the phase detector of FIG. 13;

FIG. 17 is an example of a graph of the locking band of an individual one of the push-push oscillators in the reference signal generator of FIG. 9;

FIG. 18 is an example of a suitable layout for an injectable push-push oscillator such as PS-IPPO 30 of FIG. 1. The circuitry of all the PS-IPPOs and CP-IPPOs shown and described herein, if MMIC-based, may be generally similar to that shown in FIG. 18 albeit scaled to the width and length of each individual IPPO's transmission lines.

Figure 19:
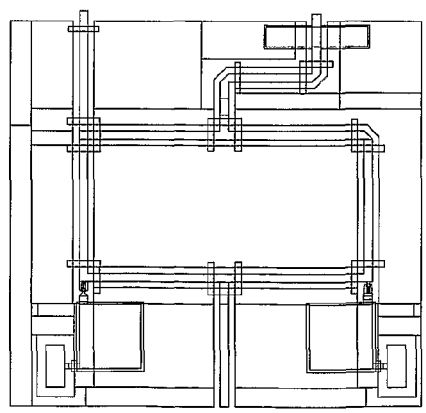
FIG. 19 is an example of a suitable layout for the balanced down converter of FIG. 11.

FIG. 19 is an example of a suitable layout for the balanced down converter of FIG. 11. The technology of the T/R module components is typically MMIC on Indium Phosphate or Gallium Arsenide substrates. The MMIC components are typically assembled in an LTCC environment, which will imbed the RF and DC connections, as well as the printed antenna on the external side.

A particular advantage of a preferred embodiment of the present invention is to lower the production cost of a phased array antenna system, including a T/R module thereof and a reference signal generator thereof, for any given frequency of the radiated signal.

A particular feature of a preferred embodiment of the present invention is that the output signal of the first chain of push-push oscillators, e.g. as shown in FIG. 1, is characterized by high stability, low noise and frequency which is high, albeit lower than the frequency of the signal radiated by the T/R module of FIG. 3. The output of the last IPPO in the chain is injected into a T/R module constructed and operative in accordance with a preferred embodiment of the present invention. The T/R module preferably comprises a chain of at least one stage of injection locked phase-shifted push-push oscillators. The frequency of the signal fed to the T/R module constructed and operative in accordance with a preferred embodiment of the present invention is multiplied by every stage of injection locked push-push oscillator, until the intended radiation frequency is achieved. The phase of the processed signal is scanned by every stage, in accordance with system requirements. Typically, the signal generated by each of the injection locked push-push oscillators of the T/R module constructed and operative in accordance with a preferred embodiment of the present invention is appropriately phase shifted such that the radiated signal has a potential phase scan of 360 degrees.

The term "commercial", as opposed to "high definition", is used herein to denote non-military radar applications such as but not limited to automatic driving applications.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A reference signal generator comprising:
    a quartz oscillator; and
    at least one level of phase shifted injection locked push-push oscillators cascaded with the quartz oscillator;
    wherein said phase shifted injection locked push push oscillators comprise one or more push push oscillators and are adapted to receive an injected signal of a specific frequency and phase, and produce a signal with a frequency that is an even integer multiple of the input frequency and with a phase shift relative to the injected signal.

2. A reference signal generator according to claim 1 wherein the reference signal generator comprises only two levels of phase shifted injection locked push-push oscillators.

3. A reference signal generator according to claim 1 wherein the reference signal generator comprises at least first and second levels of phase shifted injection locked push-push oscillators.

4. A reference signal generator according to claim 3 wherein at least one individual level of push-push oscillators comprises more than one phase shifted injection locked push-push oscillator.

5. A reference signal generator according to claim 1, further comprising multiple phase shifted injection locked push-push oscillators forming a tree structure.

6. A transmitter/receiver module comprising:
    at least one level of phase shifted injection locked push-push oscillators; and
    a receiving functionality receiving a sampled portion of power subsequently radiated by the transmitter/receiver with phase shifted injection locked push-push oscillators;
    wherein said phase shifted injection locked push push oscillators comprise one or more push push oscillators and are adapted to receive an injected signal of a specific frequency and phase, and produce a signal with a frequency that is an even integer multiple of the input frequency and with a phase shift relative to the injected signal.

7. A transmitter/receiver module according to claim 6 wherein said transmitter/receiver module comprises a plurality of levels of phase shifted injection locked push-push oscillators.

8. A transmitter/receiver module according to claim 6 wherein said receiving functionality comprises a direct balanced down converter.

9. A transmitter/receiver module according to claim 6, further comprising multiple phase shifted injection locked push-push oscillators forming a tree structure.

10. Radar imaging apparatus comprising:
    a reference signal generator according to claim 1;
    a phased array antenna including at least one transmitter/receiver module with phase shifted injection locked push-push oscillators; and
    additional apparatus cascaded with the reference signal generator and with at least one transmitter/receiver module to generate a radar image.

11. Imaging radar apparatus according to claim 10 wherein said transmitter receiver module comprises at least one level of phase shifted injection locked push-push oscillators.

12. Imaging radar apparatus comprising:
    a reference signal generator;
    at least one transmitter/receiver module according to claim 6; and
    additional apparatus cascaded with the reference signal generator and with at least one transmitter/receiver module to generate a radar image.

13. A method for generating a reference signal for radar imaging, the method comprising:
    cascading a quartz oscillator with at least one level of phase shifted injection locked push-push oscillators
    wherein said phase shifted injection locked push push oscillators comprise one or more push push oscillators and are adapted to receive an injected signal of a specific frequency and phase, and produce a signal with a frequency that is an even integer multiple of the input frequency and with a phase shift relative to the injected signal.

14. A method according to claim 13 wherein said quartz oscillator is cascaded with a plurality of levels of phase shifted injection locked push-push oscillators.

15. A method according to claim 13 wherein said at least one level of phase shifted injection locked push-push oscillators comprises only two levels of phase shifted injection locked push-push oscillators.

16. A method according to claim 13 wherein at least one individual level of phase shifted injection locked push-push oscillators comprises more than one phase shifted injection locked push-push oscillators.

17. A method for generating a radar transmitter/receiver module of a phased array antenna comprising:
 providing at least one level of phase shifted injection locked push-push oscillators and a receiving functionality receiving a sampled portion of power subsequently radiated by the phase shifted injection locked push-push oscillators; and
 wherein said phase shifted injection locked push push oscillators comprise one or more push push oscillators and are adapted to receive an injected signal of a specific frequency and phase, and produce a signal with a frequency that is an even integer multiple of the input frequency and with a phase shift relative to the injected signal.

18. A method according to claim 17 and further comprising cascading a reference signal generator and additional apparatus with said at least one level of phase shifted injection locked push-push oscillators to generate a radar image.

19. A radar imaging method comprising cascading a reference signal generator comprising at least one level of phase shifted injection locked push-push oscillators, a phased array antenna comprising at least one transmitter/receiver module, and additional apparatus to generate a radar image; and
 wherein said phase shifted injection locked push push oscillators comprise one or more push push oscillators and are adapted to receive an injected signal of a specific frequency and phase, and produce a signal with a frequency that is an even integer multiple of the input frequency and with a phase shift relative to the injected signal.

20. A method according to claim 19 wherein said transmitter receiver module comprises at least one level of phase shifted injection locked push-push oscillators.

21. A radar imaging method according to claim 19, further comprising: at least first and second levels of phase shifted injection locked push-push oscillators.

22. A radar imaging method according to claim 19, further comprising: using a cascade comprising a reference signal generator, a phased array antenna comprising at least one transmitter/receiver module comprising at least one level of phase shifted injection locked push-push oscillators, and radiating apparatus to generate a radar image.

23. A radar imaging method according to claim 19, wherein said reference signal generator comprises a quartz oscillator.

\* \* \* \* \*